(12) United States Patent
Kritzer et al.

(10) Patent No.: US 10,593,987 B2
(45) Date of Patent: Mar. 17, 2020

(54) FRAME FOR ELECTROCHEMICAL CELLS

(71) Applicant: Carl Freudenberg KG, Weinheim (DE)

(72) Inventors: Peter Kritzer, Forst (DE); Olaf Nahrwold, Ludwigshafen (DE); Rudolf Gattringer, Tragwein (AT)

(73) Assignee: CARL FREUDENBERG KG, Weinheim (DE)

( * ) Notice: Subject to any disclaimer, the term of this patent is extended or adjusted under 35 U.S.C. 154(b) by 103 days.

(21) Appl. No.: 15/329,581

(22) PCT Filed: Jul. 17, 2015

(86) PCT No.: PCT/EP2015/066388
§ 371 (c)(1),
(2) Date: Jan. 27, 2017

(87) PCT Pub. No.: WO2016/016017
PCT Pub. Date: Feb. 4, 2016

(65) Prior Publication Data
US 2018/0212267 A1 Jul. 26, 2018

(30) Foreign Application Priority Data
Jul. 28, 2014 (EP) .................................... 14002624

(51) Int. Cl.
| H01M 10/04 | (2006.01) |
| H01M 2/10 | (2006.01) |
| H01M 10/625 | (2014.01) |
| H01M 10/647 | (2014.01) |
| H01M 10/6556 | (2014.01) |
| H01M 10/6567 | (2014.01) |
| H01M 10/613 | (2014.01) |
| H01M 10/6568 | (2014.01) |

(52) U.S. Cl.
CPC ..... H01M 10/0486 (2013.01); H01M 2/1061 (2013.01); H01M 2/1077 (2013.01);
(Continued)

(58) Field of Classification Search
None
See application file for complete search history.

(56) References Cited

U.S. PATENT DOCUMENTS

2003/0170528 A1* 9/2003 Simpson ............... H01M 8/023
429/414
2004/0076863 A1* 4/2004 Baars ........................ C25B 9/04
429/434

(Continued)

FOREIGN PATENT DOCUMENTS

CH    647852 A5    2/1985
DE    102009016576 A1    11/2009
(Continued)

OTHER PUBLICATIONS

Fortu (EP 2608309) (a raw machine translation) (Abstract & Detailed Description) (Year: 2013).*
Hasler et al. (CH 647852) (Year: 1985).*

*Primary Examiner* — Carmen V Lyles-Irving
(74) *Attorney, Agent, or Firm* — Leydig, Voit & Mayer, Ltd.

(57) ABSTRACT

A frame can be mounted easily in an arrangement and which protects the cells received in the arrangement in as optimum manner as possible with high operational suitability, a frame for fixing cells, has a frame body, in which at least one cooling duct for a cooling medium is configured, wherein the frame has at least one plug-in piece for connecting to another frame, wherein the cooling duct runs at least partially within the plug-in piece.

22 Claims, 23 Drawing Sheets

(52) U.S. Cl.
CPC ....... *H01M 10/613* (2015.04); *H01M 10/625* (2015.04); *H01M 10/647* (2015.04); *H01M 10/6556* (2015.04); *H01M 10/6567* (2015.04); *H01M 10/6568* (2015.04); *H01M 2220/20* (2013.01)

(56) References Cited

U.S. PATENT DOCUMENTS

| | | | |
|---|---|---|---|
| 2006/0040148 A1* | 2/2006 | Blunk | H01M 8/0228 429/518 |
| 2009/0258288 A1* | 10/2009 | Weber | H01M 2/10 429/120 |
| 2011/0003185 A1 | 1/2011 | Kritzer | |
| 2011/0293982 A1 | 12/2011 | Martz et al. | |
| 2012/0040223 A1 | 2/2012 | Odumodu | |
| 2012/0070710 A1 | 3/2012 | Kritzer et al. | |
| 2013/0207459 A1 | 8/2013 | Schroeder et al. | |

FOREIGN PATENT DOCUMENTS

| | | |
|---|---|---|
| DE | 202011052087 U1 | 2/2013 |
| EP | 2432043 A1 | 3/2012 |
| EP | 2608309 A1 | 6/2013 |
| JP | H 07205239 A | 8/1995 |
| KR | 20110004304 A | 1/2011 |
| WO | WO 2009128220 A1 | 10/2009 |
| WO | WO 2013037742 A1 | 3/2013 |

\* cited by examiner

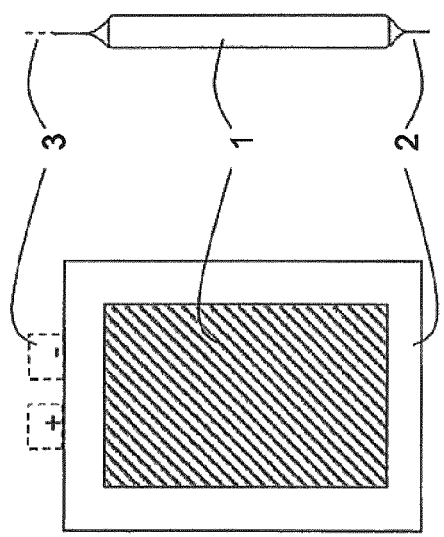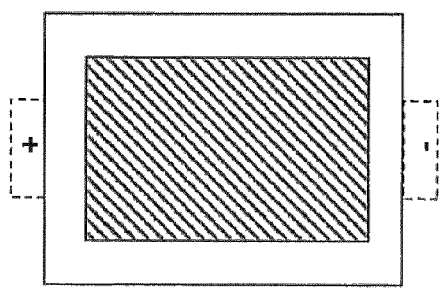
Fig. 1

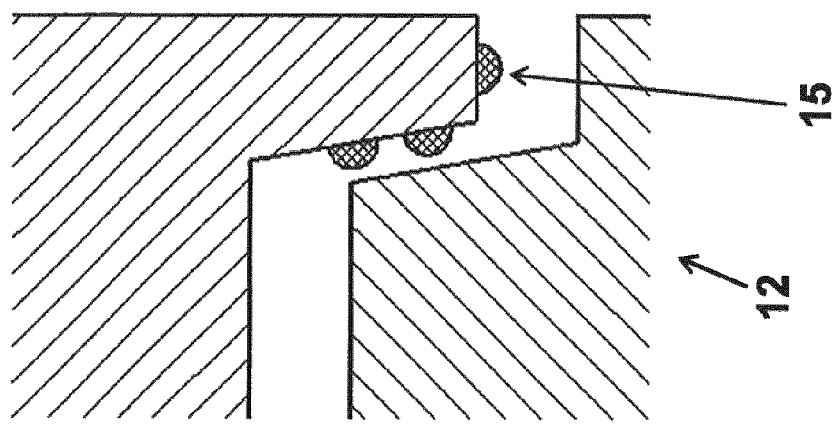
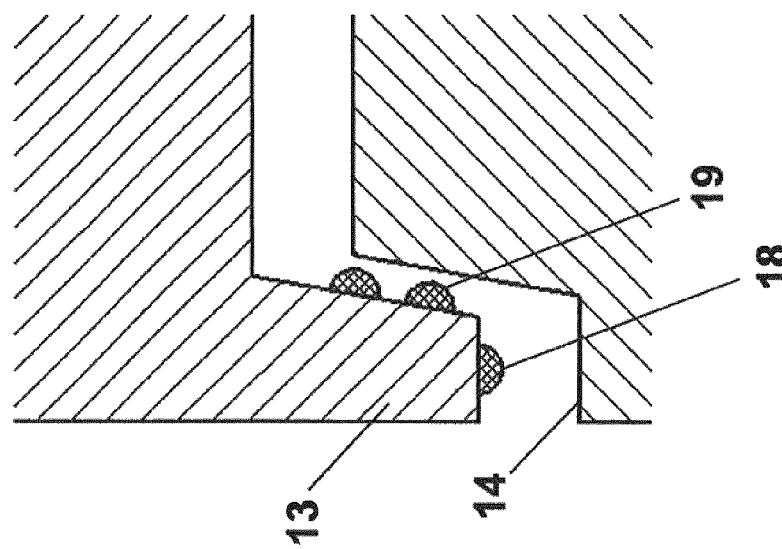
Fig. 10

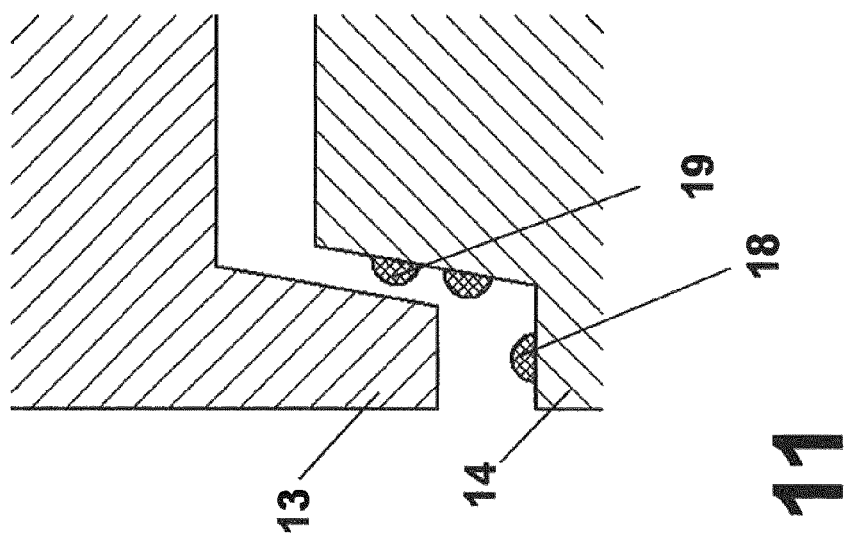
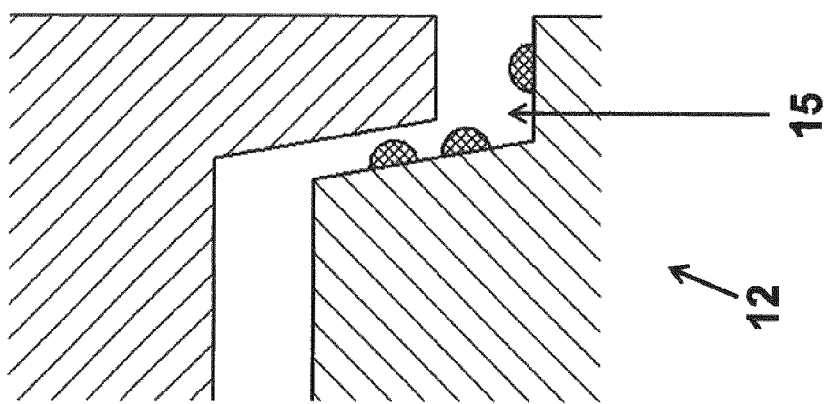
Fig. 11

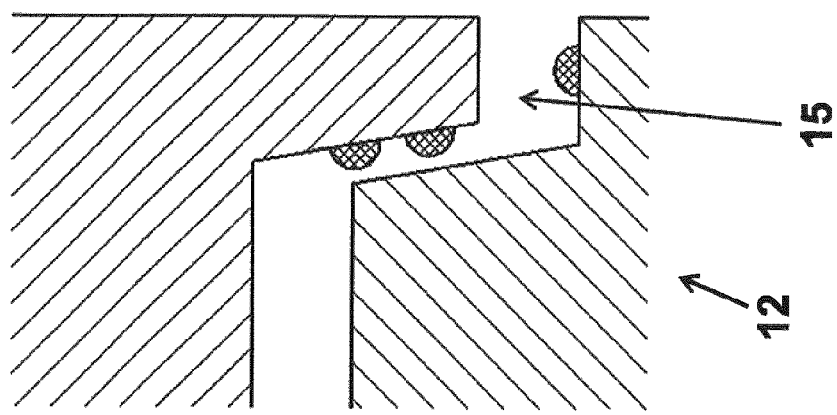
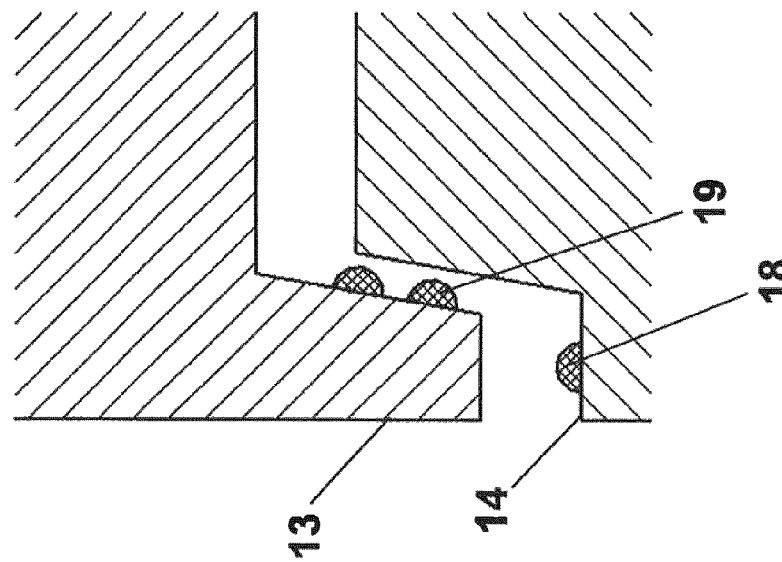
Fig. 13

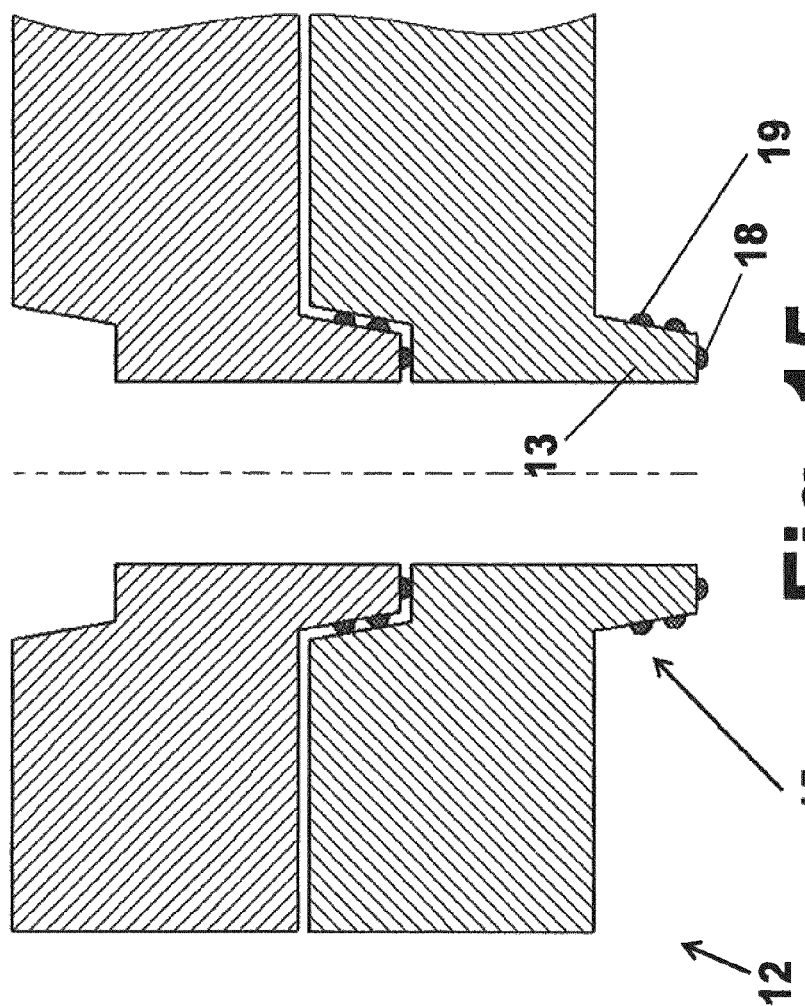

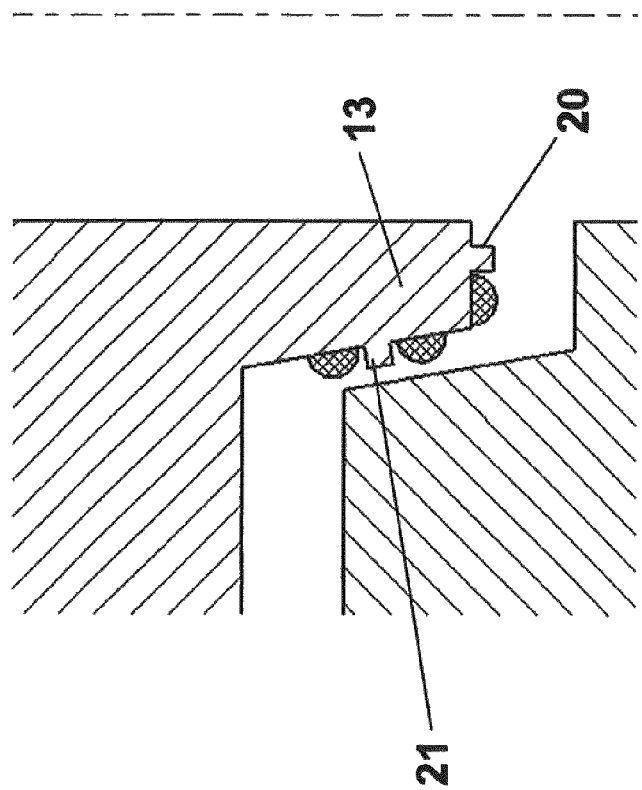

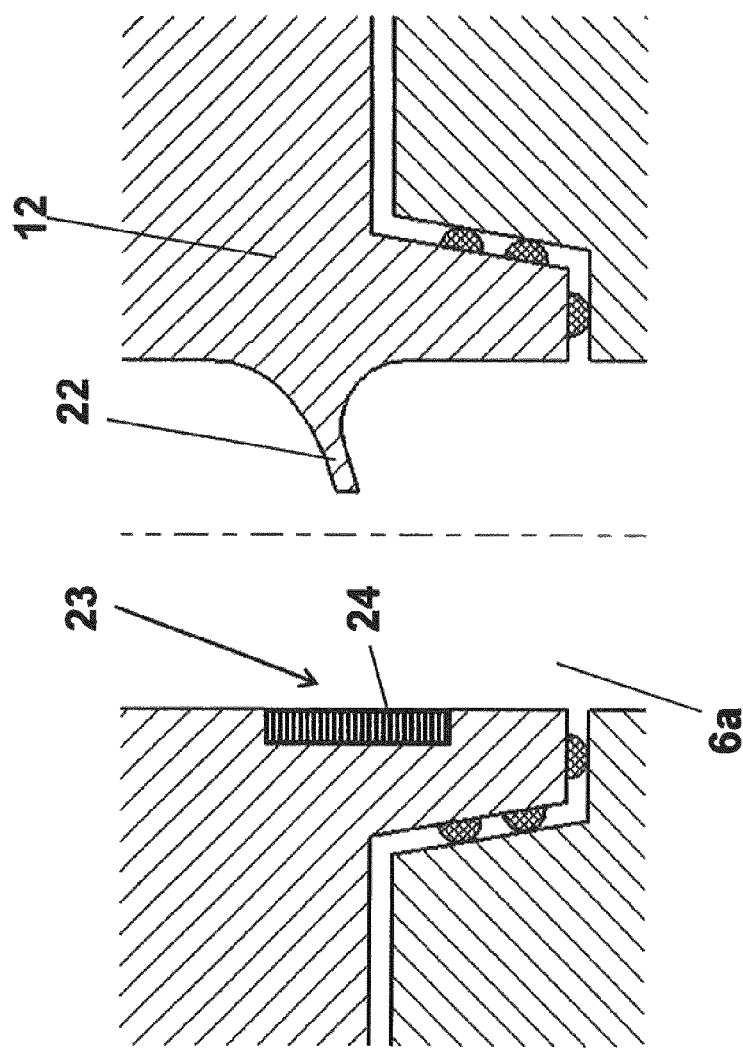

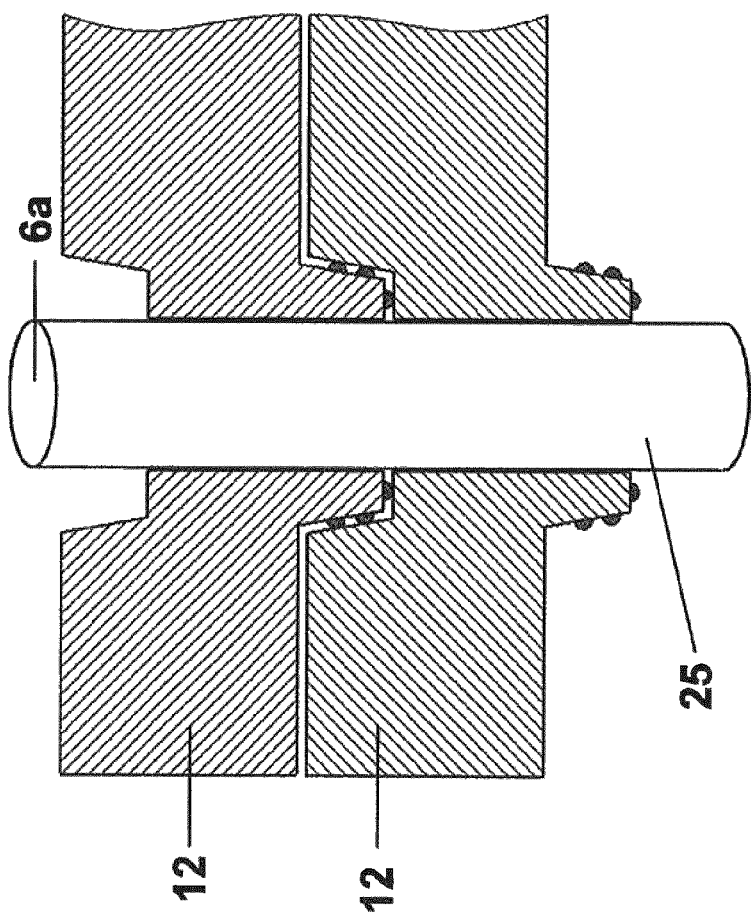

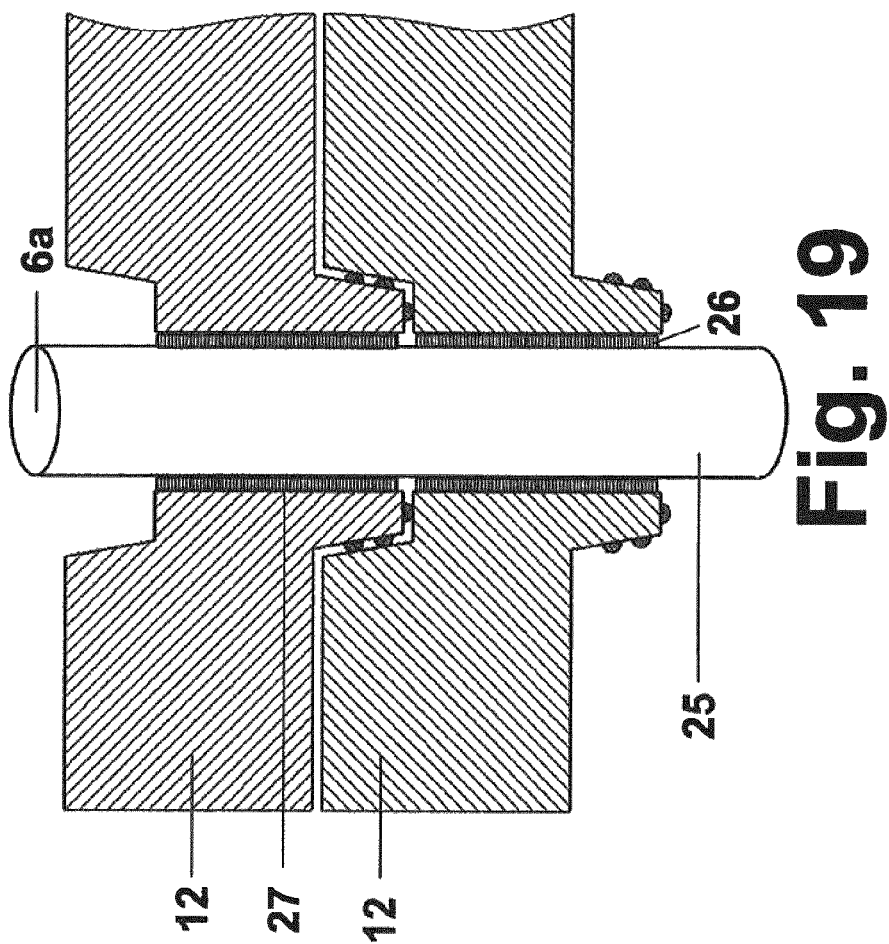

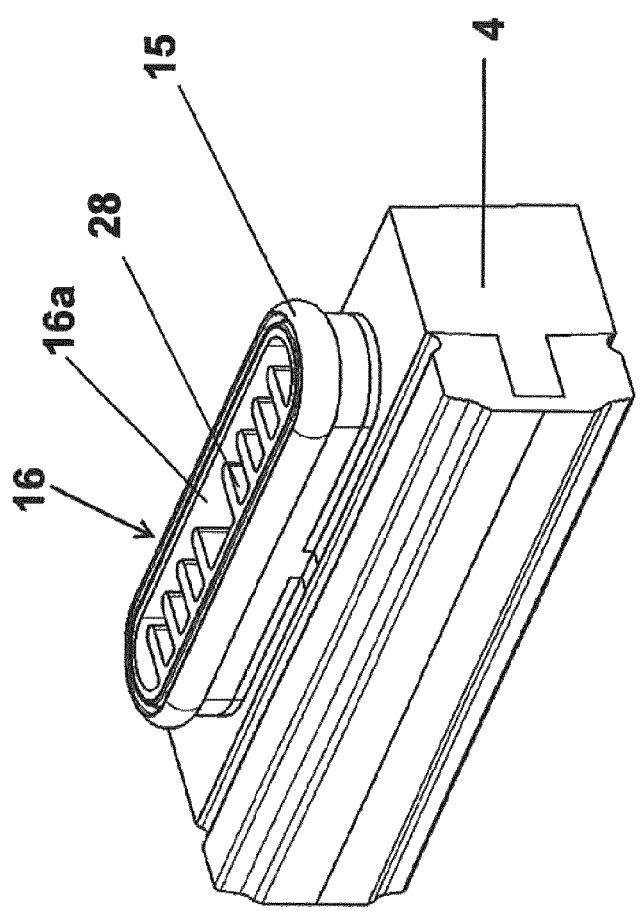

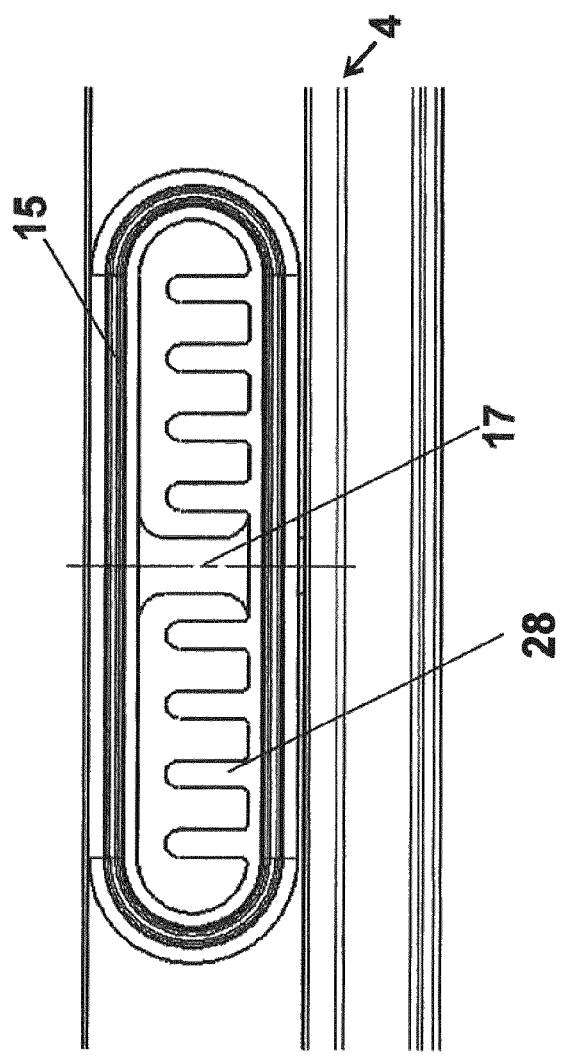

FRAME FOR ELECTROCHEMICAL CELLS

CROSS-REFERENCE TO RELATED APPLICATIONS

This application is a U.S. national stage application under 35 U.S.C. § 371 of International Application No. PCT/EP2015/066388, filed on Jul. 17, 2015, and claims benefit to European Patent Application No. 14 002 624.6, filed on Jul. 28, 2014. The International Application was published in German on Feb. 4, 2016, as WO 2016/016017 A1 under PCT Article 21(2).

FIELD

The invention relates to a frame for an electrochemical cell.

BACKGROUND

Such a frame is already known from EP 2 432 043 A1.

Cells in a battery system, in particular a lithium battery system, are normally designed as round cells, prismatic cells or pouch cells. Pouch cells have cell housings made from films.

Owing to the advantages of pouch cells over prismatic cells, in particular their lower production costs, pouch cells are already exclusively used in mobile telephones, digital cameras or cars. Pouch cells are used in particular in electric vehicle batteries.

A major technical advantage of pouch cells is their adaptability to future cell chemistry concepts.

For example, new anode materials, in particular based on silicon, which have a greatly increased lithium absorption capacity and therefore increased energy density in comparison to the currently standard graphite anodes, lead to greatly increased volumetric work in cyclisation.

In the case of prismatic cells, this leads to significant bulging of the solid cell housing, which is associated with mechanical problems and density problems. In the case of pouch cells, on the other hand, this volumetric work can be compensated for by the flexible cell housing made from films.

Moreover, some cells in a battery system cannot be placed edge to edge next to one another. An additional spacing element, namely a so-called spacer, is therefore required between the cells.

Frames for fixing pouch cells or for fuel cells are known in particular from EP 2 432 043 A1. Furthermore, frames are known which have ducts through which cooling media can flow. US 2012/0040223 A1 and US 2011/0293982 A1 disclose such frames.

SUMMARY

An aspect of the invention provides a frame for fixing one or more cells, the frame comprising: a frame body including a cooling duct configured to contain a cooling medium, formed in the body; and a plug-in piece configured to connect to another frame, wherein the cooling duct extends at least partially inside the plug-in piece.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a pouch cell having a protruding film current collector;

FIG. 10 is a sectional view of a plug-in piece, on the male part of which partial seals acting radially and axially are arranged;

FIG. 11 is a sectional view of a plug-in piece, on the female part of which partial seals acting radially and axially are arranged;

FIG. 13 is a sectional view of two plug-in pieces, two partial seals acting radially being arranged on the male part of a first plug-in piece and a partial seal acting axially being arranged on the female part of a second plug-in piece;

FIG. 15 is a sectional view of two identical plug-in pieces, two partial seals acting radially and one partial seal acting axially being arranged on the male part of a plug-in piece and no partial seals being arranged on the female part of the plug-in piece;

FIG. 16 is a sectional view of a plug-in piece, two partial seals acting radially and one partial seal acting axially being arranged on the male part of a plug-in piece and fins acting axially and radially being provided and each forming a stop;

FIG. 17b is a sectional view of a plug-in piece, two partial seals acting radially and one partial seal acting axially being arranged on the male part of a plug-in piece and a flow plate projecting radially inwards being formed and a surface, which improves heat transfer, being applied to the surface onto which the flow is directed;

FIG. 18 is a sectional view of two identical plug-in pieces, two partial seals acting radially and one partial seal acting axially being arranged on the male part of a plug-in piece and no partial seals being arranged on the female part of the plug-in piece and a tube passing through the plug-in pieces;

FIG. 19 is a sectional view of two identical plug-in pieces, two partial seals acting radially and one partial seal acting axially being arranged on the male part of a plug-in piece and no partial seals being arranged on the female part of the plug-in piece, a tube passing through the plug-in pieces and a layer being arranged between the tube and the plug-in pieces as a means for compensating tolerances;

FIG. 20 shows an almost rectangular plug-in piece as shown in FIG. 7 in which heat transfer fins are arranged in the cooling duct thereof to improve heat transfer;

FIG. 21 shows a plug-in piece similar to that shown in FIG. 20 in which mechanically strengthening struts are arranged in addition to heat transfer fins.

DETAILED DESCRIPTION

Figure 2:
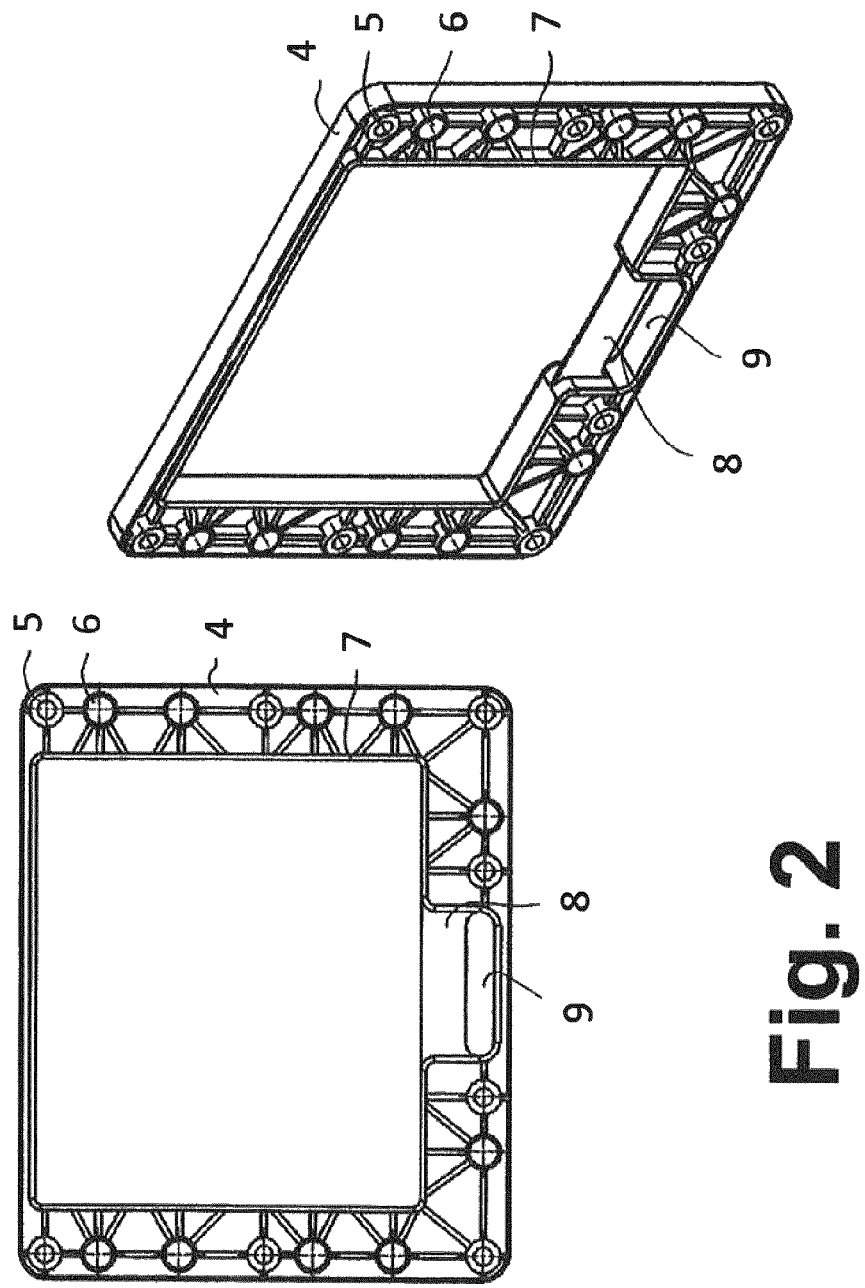
FIG. 2 is two views of a frame, showing drilled holes for cooling ducts.

Frames for fixing pouch cells must ensure a sealing of their seal seams. Moreover, a directed discharge of the electrolyte must be ensured in the event of damage, it also being necessary to ensure that released flammable gases cannot come into contact with live parts.

Moreover, there must be tolerance compensation in a so-called stack. Vibrations, which have an effect on a cell, must be reduced. Besides this, a cooling circuit must be connected to the frame.

Moreover, there is a need for improved fixing and mechanical buffering of the electrodes.

Furthermore, a stack must have vibration resistance and shock resistance. This is particularly relevant in the case of battery systems used in cars, in particular electric vehicles, hybrid vehicles, utility vehicles, buses or heavy goods vehicles.

The vibration resistance must also be present in other mobile applications such as in trains, aircraft or machines.

The vibration resistance is necessary during operation. In the case of passenger car applications in particular, the battery housing is not normally mounted in a flexible manner and therefore not in a vibration-resistant manner either. The components of the battery system must therefore have a high vibration resistance. Resistance against mechanical knocks, typical requirements are accelerations up to 100 g, can have an impact above all in the event of accidents.

In all cases, it must be ensured that no leakage occurs in the cooling circuit. If this should occur, cooling medium, for example water, can come into contact with live parts.

Additionally, in this case, there is a risk in the case of a cell opening, of the cooling medium coming into contact with exposed cell components, for example lithium. This can lead to serious consequences. There may be a release of hydrogen.

The efficiency and homogeneity of the cooling poses a particular challenge with respect to the long-time stability of the electrochemical cells. Too high or too low temperatures can lead to premature ageing of the cells. Inhomogeneous temperature control can lead to uneven ageing of the cells and thus to decreasing power of the overall system.

An aspect of the invention is therefore to provide a frame which can be mounted easily in an arrangement and which protects the cells received in the arrangement in as optimum a manner as possible with high operational suitability.

Firstly, according an aspect of the invention, it has been found that cooling ducts must be integrated into frames, it being possible for the cooling ducts to be provided as plug-in pieces protruding on one side of a first frame and projecting into the other side of a second, adjacent frame. Such plug-in pieces can be male parts in the form of connectors and/or female parts in the form of recesses.

As a result of this—in particular as a result of plug-in pieces protruding in part out of the plane of the frame—a surprisingly mechanically stable and dense connection is ensured. This connection effectively withstands vibrations and mechanical knocks in particular.

Moreover, mechanical tensions, which can, for example, be brought about by a temperature change, can be compensated for. The arrangement produced in this manner also allows tolerance compensation of production tolerances. As a result of the projection of the connectors into the respective adjacent frame, the frames are firmly connected to one another and thus contribute to the mechanical stability of a stack. Therefore additional, separate connecting pieces can normally be omitted.

Such an arrangement comprising a frame therefore requires comparatively fewer components. Firstly, there is no need to provide tubes or cooling plates. An arrangement can be manufactured simply and assembled in a time-saving manner. Forgetting individual, essential components during assembly is ruled out. This can be achieved by a poka-yoke principle.

In this respect, a frame is provided which can be mounted easily in an arrangement and which protects the cells received in the arrangement in as optimum a manner as possible with high operational suitability.

An aspect of the invention mentioned at the outset is consequently achieved.

The plug-in piece could project at least in part out of the frame plane such that it can project into a complementary opening in a plug-in piece of an adjacent frame. In this manner, the frame has plug-in pieces between said frame and an adjacent frame, through which cooling media can flow.

The plug-in piece could have a round or rectangular cross section. Round plug-in pieces are easy to manufacture, rectangular ones lead to improved use of the frame.

The plug-in piece could have a male part and a female part, the male part being suitable for being introduced into the female part of an adjacent frame and the female part being suitable for receiving the male part of an adjacent frame. In this manner, each frame of a stack or of an arrangement can be constructed so as to be identical and at the same time complementary to another frame.

The plug-in piece could have at least one seal. This prevents a liquid leaking out of a cooling duct. A seal could be attached to the plug-in pieces. The seal could be arranged on the male part of the plug-in piece and/or on the female part of the plug-in piece. An elastomer, preferably EPDM, VMQ, HNBR, FKM or butyl rubber, could be used as the seal material. For simpler applications, thermoplastic elastomers could also be used.

The plug-in piece and the seal could be constructed integrally. The frame and the seals could therefore be produced in a single component. This can be achieved by a two-component method.

The seal could have O-rings or insertion parts. In this manner, the frame and the seals could be assembled after production, the seals being constructed as insertion parts such as O-rings.

The plug-in piece could have a seal, which seals radially and/or axially. Therefore, sealing can be only radial, only axial or axial and radial. Seals can be attached to connectors of and/or recesses in a plug-in piece or a frame. The seals are preferably arranged so as to act radially and axially, but at least to act radially.

The plug-in pieces are preferably constructed such that they have at least one radial sealing portion so that as high a tolerance compensation as possible is ensured. Tolerances can emerge as a result of production, thermal expansion or necessary vibration resistance.

Moreover, said plug-in pieces can also have an axial sealing portion, which gives additional security. A multi-lip design of a seal improves reliability.

A seal could comprise a plurality of partial seals, i.e. be designed so as to be multi-lipped. As a result, the sealing effect is increased and the sealing is very secure, since a partial seal may fail and the failure can be compensated for by another seal.

When using a sealing material for sealing cells and sealing the plug-in pieces, it is possible to attach the seals in one process step. Thermally conductive materials for the frame and/or sealing materials improve heat transfer and are therefore preferred.

The frame could withstand pressure up to 10 bar maximum, preferably up to 30 bar maximum, most preferably up to 130 bar maximum, depending on the cooling medium. The frame could be designed such that it withstands pressure up to 10 bar maximum if water or a water-based cooling medium is used. The frame could be designed such that it withstands pressure up to 30 bar maximum if fluorinated or partially fluorinated organic media of an air conditioning unit are used as cooling media. The frame could be designed such that it withstands pressure up to 130 bar maximum if carbon dioxide is used as the cooling medium. In the event of high pressure, the use of tubes which are introduced into the plug-in pieces is particularly preferred.

For cooling circuits on a water/glycol basis, the seals should withstand pressure up to 10 bar. Materials having low water permeation such as EPDM, FKM, HNBR or butyl rubber are worth considering as sealing materials for parts which are in contact with cooling liquid.

When using partially fluorinated cooling media, such as R 1234yf, the seals must be able to seal against an internal excess pressure of up to approximately 30 bar.

If carbon dioxide is used as the cooling medium, the seals must be able to seal against internal excess pressure of up to approximately 130 bar.

In the case of a multi-lipped configuration of a seal or a lower requirement for gas permeation, sealing materials can be used which allow a comparatively high permeation of the cooling medium, for example silicon-based elastomers.

A flow plate could be arranged in at least one plug-in piece. Flow plates could be arranged in the plug-in pieces and generate a laminar or turbulent flow directed onto the frame and consequently improve heat transfer and the efficiency of the cooling. The side having the flow directed thereto preferably projects towards the cell body.

Good heat transfer is achieved from the cooling duct to the frame. By attaching flow plates in the cooling duct, the heat transfer between the cooling duct and a cell can be further improved. This allows the use of polymers, i.e. electrically non-conductive materials. This also allows a lower flow amount of cooling medium to be achieved. The diameter of cooling ducts can consequently be reduced or the cooling efficiency can be increased when the diameter is the same.

A flow surface could be arranged in at least one plug-in piece. A flow surface could be formed in the plug-in pieces, onto which the flow is directed.

The flow surface could have an increased roughness. The flow surface could have an increased thermal conductivity. This can be achieved for example by a metallic insert.

The flow surface to which the flow is directed could preferably be attached towards the cell body.

A heat transfer fin could be arranged in at least one plug-in piece. Heat transfer fins could be arranged in the plug-in pieces, and allow increased heat transfer from the cells via the frame into a fluid.

A clip element could be formed in at least one plug-in piece. Clip elements could be formed in the plug-in pieces, and lead to additional locking when the frames are plugged together.

A plug-in piece could be mechanically stabilized by struts attached internally. The plug-in piece is stabilized as a result.

An arrangement could comprise at least two frames of the kind described here, a cell being arranged between the frames, a male part of a first plug-in piece projecting into a female part of a second frame, and a cooling duct for a cooling medium being directed through the plug-in pieces. A stack or module could consist of two or more cells or frames.

A seal, which is arranged on a male and/or female part, could be in the main line of force or in a force shunt.

At least one tube, in which the cooling duct is formed, could be directed through the plug-in pieces. Tubes carrying cooling medium could be directed through openings in the plug-in pieces. In the event of high pressure, the use of tubes, which are introduced into the plug-in pieces, is particularly preferred.

Each tube could be directed through one opening in a plug-in piece, a means for compensating tolerance being arranged between the tube and the inner wall of at least one opening. Tubes carrying cooling medium could be directed through the openings in the plug-in pieces, a material for compensating tolerances being applied to the inner wall of the openings.

An external housing could be part of a cooling duct, a plug-in piece of a last frame being introduced into a drilled hole in the housing. An external housing could be included in a cooling duct, the plug-in piece of the last frame being introduced into a drilled hole in the housing.

A battery system could comprise an arrangement of the kind described here. A battery system could comprise one stack and at least two frames of the kind described here. The purpose of the frame described here is to fix electrochemical energy storage cells having a flexible cell design, in particular pouch cells, lithium ion cells or lithium sulfur cells.

The frame could be fixed and have a peripheral, reversibly compressible cell seal. Such a cell seal can press against the seal seam of a pouch cell in the greater part of its periphery. As a result of this, the cell is mounted flexibly against the frame. Such a cell seal can be provided on both sides of a frame.

The frame described here is particularly suitable for battery systems comprising pouch cells, the temperature of which has to be effectively and homogenously controlled, for systems which are additionally exposed to mechanical vibrations, in particular mobile applications such as cars, utility vehicles, trains, aircraft, "off-highway" applications such as material movement vehicles, construction machines, tractors, unmanned robots, and for systems which have a particularly high energy throughput, which firstly requires increased cooling and secondly leads to a higher frequency of change in thickness of the cells.

In addition to the applications referred to above, this also relates to stationary systems such as batteries for network frequency stabilization or back-up applications or battery systems having anode/cathode materials which are subject to particularly high volumetric work during cyclisation.

FIG. 1 shows two pouch cells, namely galvanic cells each having a flexible case.

Such a pouch cell has a cell body 1, in which electrode separator layers are located, and a peripheral seal seam 2, in the region of which an upper and lower cover film are welded to one another.

A pouch cell has film current collectors 3 which project between the cover films and are additionally covered by a film.

The film current collectors 3 can all project on the same side, as shown in the right-hand view in FIG. 1, or on opposite sides, as shown in the left-hand view in FIG. 1.

During operation of the pouch cell, namely when charging or discharging, the thickness of the cell body 1 changes by typically 5-10%.

Furthermore, an aged pouch cell is approximately 5% thicker than a new pouch cell. Therefore, an aged and charged pouch cell is approximately 10% thicker than a new and uncharged pouch cell. Even greater values of changes in thickness are to be expected in future cell chemistry systems.

In particular, new anode materials, namely silicon-based materials, which allow a higher percentage lithium intercalation capacity in comparison to graphite carriers currently used undergo even greater volumetric work. In the case of new anode materials, which allow higher capacity cells, the volumetric work of the pouch cells is therefore increasingly relevant.

Owing to the flexibility of the pouch cell, cooling is of particular importance. Currently, thermal contact is established with the film current collectors 3 of the pouch cell in particular.

This, however, has the following disadvantages: condensation may form on live parts. The consequences may be short circuits. Owing to the small cross section of the film current collectors 3, the total amount of heat that can be transported out of the pouch cell is limited.

Alternative cooling concepts include establishing contact with the seal seam 2 of the pouch cells or the region of the cell body. As a result of this, homogenous and efficient cooling can be achieved.

In the process, a major challenge is the heat transfer from the interface of the cell body 1/seal seam 2 to a frame and cooling circuit. This is a challenge particularly if the frame is made of plastics material.

An arrangement is described below, in which cooling ducts are integrated into a frame for fixing cells.

FIG. 2 is two views of a frame for fixing pouch cells in a battery housing.

This frame has a fixed frame body 4 and through-openings 5 for fixing rods.

Furthermore, integrated drilled holes 6 for tubes are provided. A peripheral elastomer cell seal 7 is provided, which in the assembled state, presses onto a seal seam 2 of a pouch cell shown in FIG. 1.

Furthermore, a recess 8 is provided, in which the cell seal 7 is not in contact with the seal seam 2 of the cell. In the event of a malfunction, gas leaking from the cell can escape perpendicularly to the cell plane through a discharge duct 9.

Such a frame can be made of plastics material, for example polyamide, polyester, PPS, other thermoplastics or thermosetting plastics.

Reinforcement by inorganic fibers, for example glass or carbon, is advantageously provided.

Furthermore, flame retardant properties of the material from which the frame is manufactured are advantageous. These properties can be provided by inorganic filling materials.

Moreover, it is advantageous with respect to safety if a frame consists of an electrically insulating material.

Furthermore, thermal conductivity of the material from which the frame is manufactured is advantageous—in particular for thermally stressed cells. The thermal conductivity should be above a value of 0.5 W/(m*K).

This conductivity can be provided by the following materials:

Thermally conductive plastics materials such as Albis Plastic//ALCOM PA66 910/30.1 TCE5 (thermal conductivity 5 W/(m*K)), Albis Plastic//ALCOM PA66 910/30.1 TCE10 (thermal conductivity 10 W/(m*K)), CoolPoly® E3607 (thermal conductivity 20 W/(m*K)), BASF PA 6; B3UGM210 (thermal conductivity 1 W/(m*K)) or CoolPoly® D3612 (thermal conductivity 6 W/(m*K)).

The first three materials are also electrically conductive, the fourth and fifth materials are not.

The frame can also be produced from metal. In this case, it is particularly sensible to achieve lightweight designs.

When using electrically conductive materials for manufacturing the frame, it must be ensured in any case that no contact is made with the film current collectors 3. The consequence may be short circuits.

The peripheral cell seal 7 can be constructed so as to be single or multi-lipped. A wide design of the cell seal 7 is advantageous in order to be able to compensate for tolerances caused by process fluctuations in the case of which thin seals would press onto the seal seam 2 asymmetrically from both sides and expose it to increased mechanical stress.

The cell seal 7 should typically be designed such that it seals the seal seam 2 of the cell such that it does not open in the event of internal excess pressure above 1 bar onto the sealed points.

The cell seal 7 is preferably manufactured from elastomer materials having low setting behavior. Silicon rubber-based cell seals 7, which have good properties particularly with respect to flame retardation, can most preferably be used.

In the case of lower demands on the cell seal 7, for example in the case of a limited useful life of a battery or in the case of cost-driven applications, thermoplastic elastomers can also be resorted to.

Figure 3:
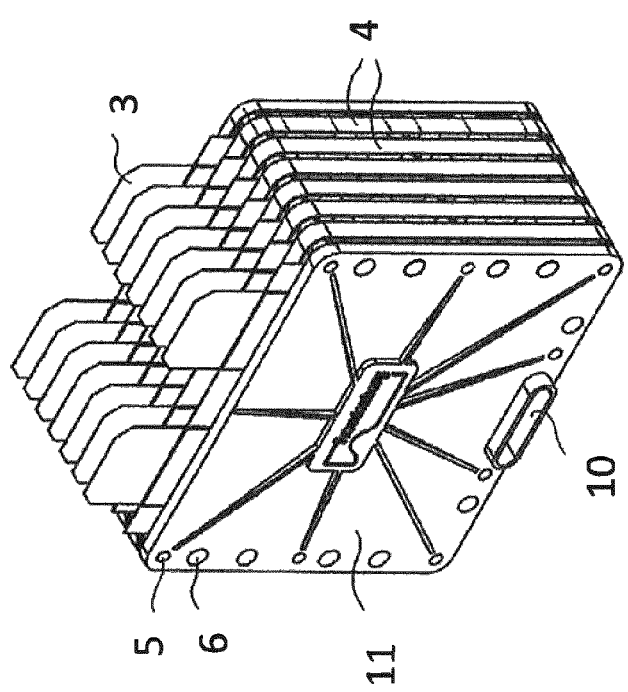
FIG. 3 is an arrangement, namely a stack, of pouch cells, between which frames are arranged.

FIG. 3 shows an arrangement, namely a stack consisting of a plurality of frames having frame bodies 4, a pouch cell according to FIG. 1 being placed between each two frame bodies 4.

The film current collectors 3 project out of the frame bodies 4. On both sides of the arrangement, a cover plate 11 is arranged, which closes the stack of cells and frames on the outside.

This cover plate 11 can also be integrated into a housing, i.e. a housing part, for example a wall, base or cover, can assume the function of the cover plate 11.

Through openings 5 for fixing rods and integrated drilled holes 6 for tubes are contained in the cover plate 11.

Furthermore, an emergency discharge through-hole 10 is provided, through which possible malfunction emissions collected in the discharge ducts 9 can be discharged safely out of the stack or a housing.

Figure 4:
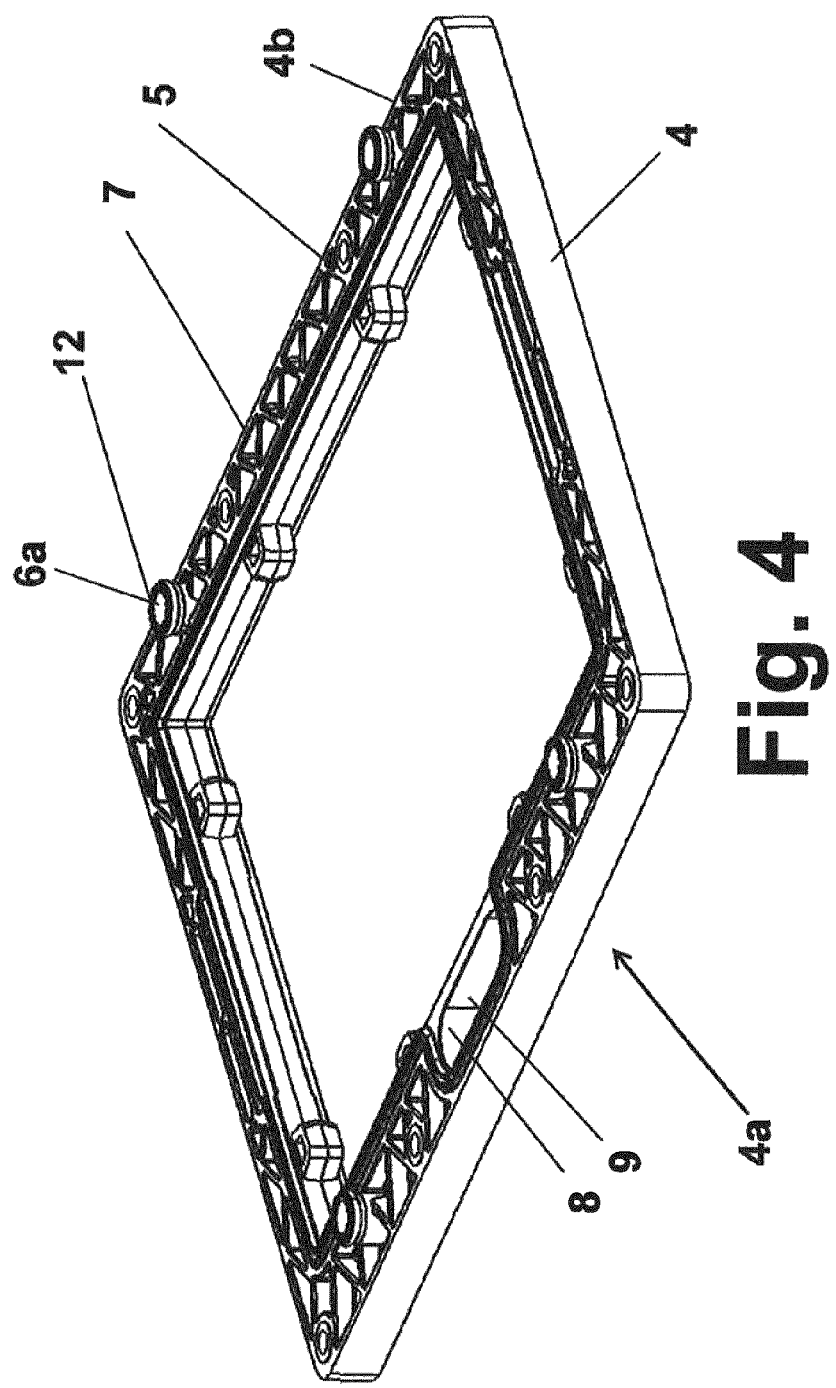
FIG. 4 is a further view of a frame, in which round plug-in pieces are integrated, which project out of the plane of the frame.

FIG. 4 shows a frame 4a for fixing cells, comprising a frame body 4 in which at least one cooling duct 6a for a cooling medium is formed.

The frame 4a has at least one plug-in piece 12 for connecting to another frame, the cooling duct 6a extending at least partially inside the plug-in piece 12.

The plug-in piece 12 projects at least in part out of the frame plane 4b such that it can project into a complementary opening in a plug-in piece of an adjacent frame.

The plug-in piece 12 has a round cross section.

The cooling ducts 6a likewise have a round cross section, as a result of which a connection to hoses and tubes outside of the frame 4a can be established particularly easily.

FIG. 4 shows a frame 4 having plug-in pieces 12 for the cooling circuit. When assembling adjacent frames, male parts 13 of plug-in pieces 12 are introduced into female parts 14, in particular recesses.

Figure 5:
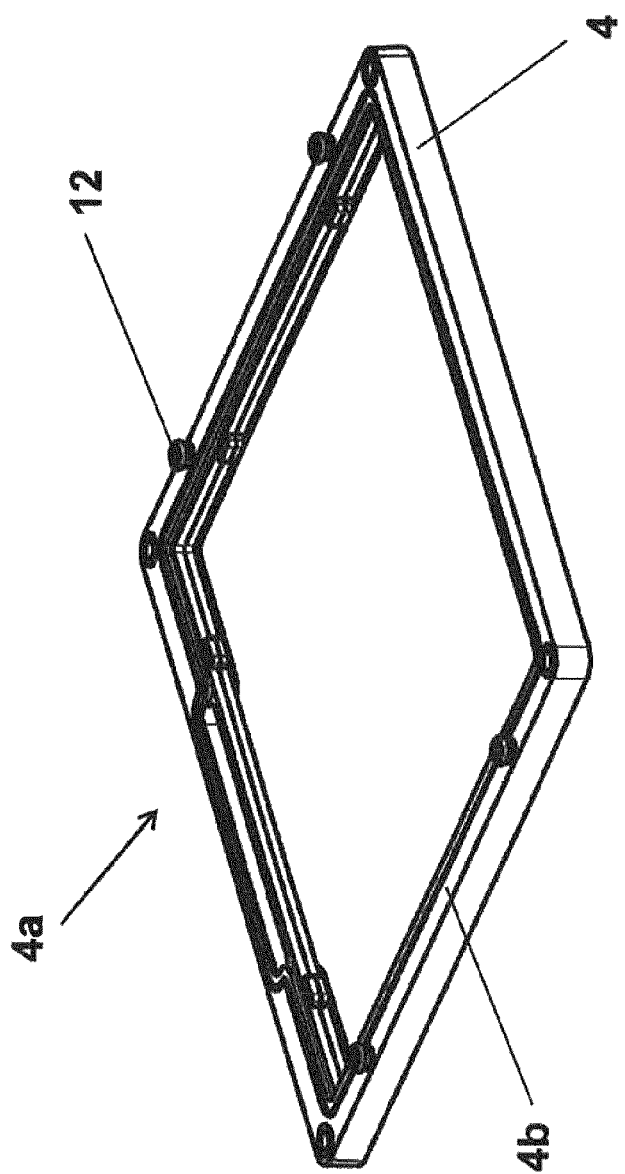
FIG. 5 is a further view of a frame, in which round plug-in pieces are integrated, which project out of the plane of the frame.

FIG. 5 shows the frame 4a having plug-in pieces 12, which have a round cross section.

Figure 6:
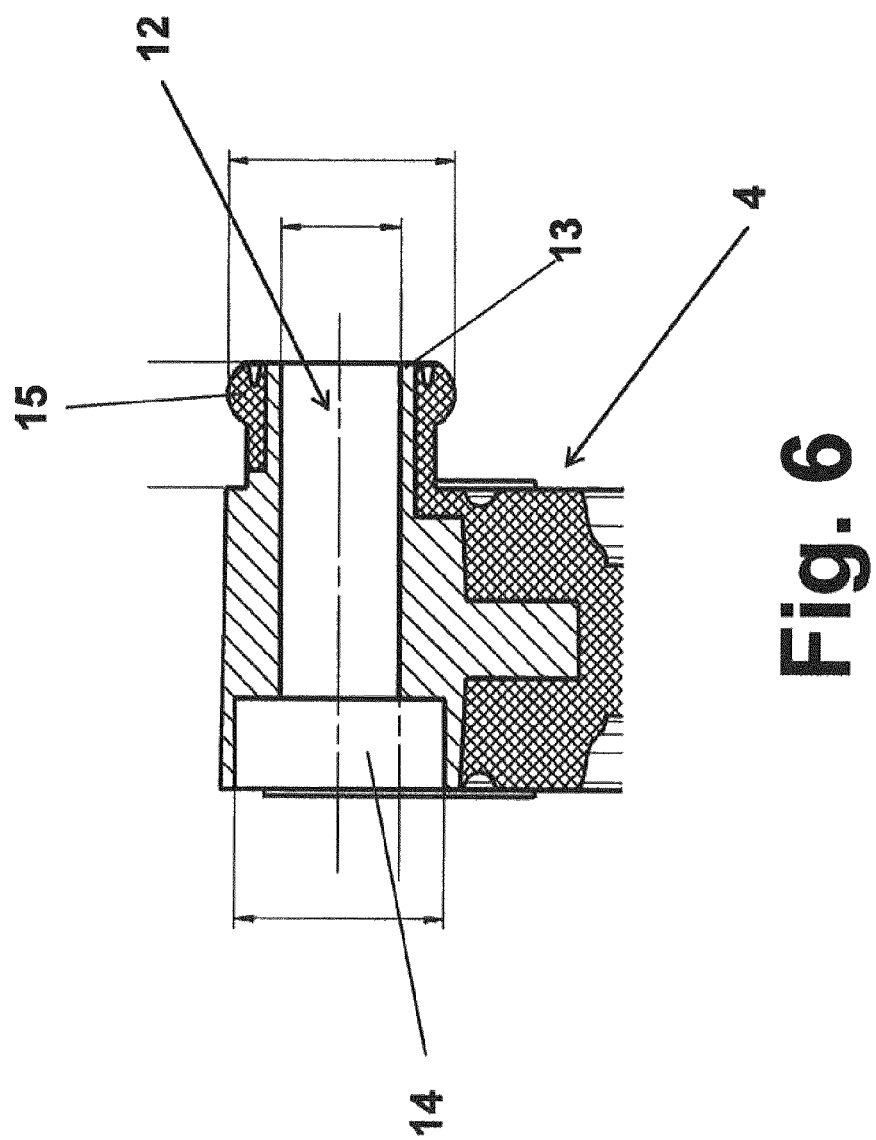
FIG. 6 is a sectional view of a round plug-in piece integrated in the frame.

FIG. 6 is a cross section of a plug-in piece 12 integrated in the frame body 4. The male part 13 of the plug-in piece 12 can project into a female part of the plug-in piece of an adjacent frame. It is shown here that the frame body 4 also has such a female part 14, namely a recess, into which the male part 14 could be introduced.

The plug-in piece 12 has at least one seal 15. The plug-in piece 12 contains an elastomer seal 15, which protrudes in a bulge. The plug-in piece 12 and the seal 15 are formed integrally.

Figure 7:
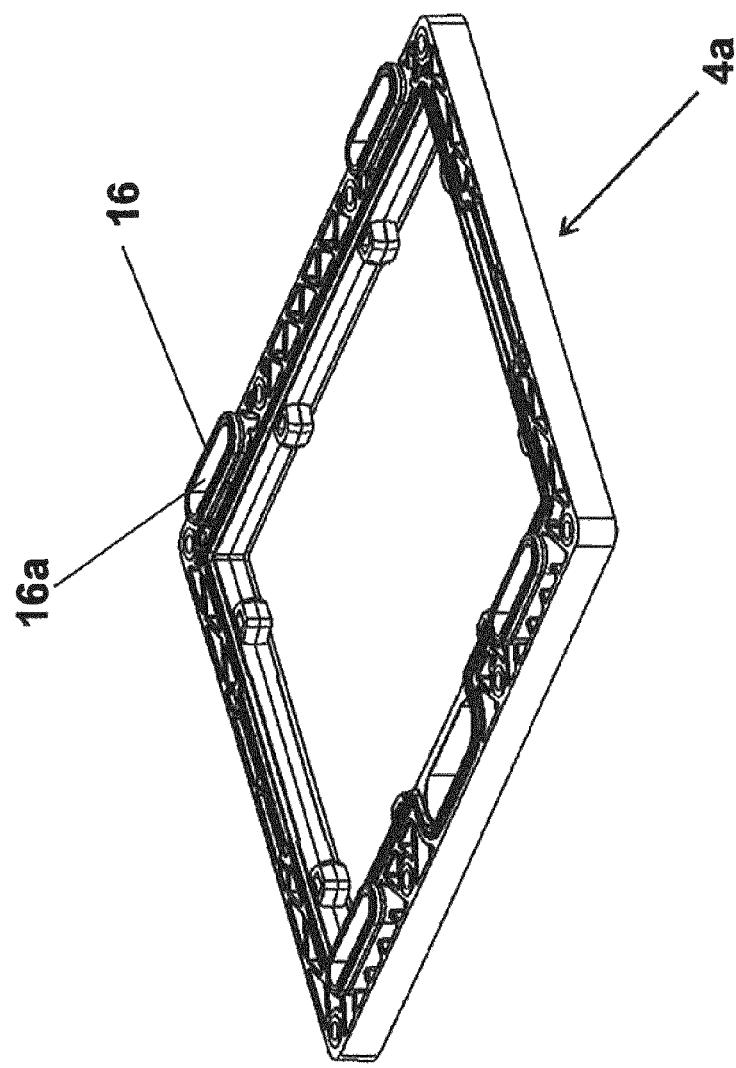
FIG. 7 is a view of a frame in which almost rectangular plug-in pieces are integrated, which project out of the plane of the frame.

FIG. 7 shows a frame 4a having non-round plug-in pieces 16. The cooling ducts 16a of the plug-in pieces 16 can also have a broader width. The cooling ducts 16a can have a rectangular or oval cross section. This is advantageous particularly in the case of high requirements for temperature control.

Additional ribs arranged transversely can be attached inside the cooling ducts 16a, which increase mechanical stability. This is necessary in particular in the case of required high internal pressure, for example when using partially fluorinated media or carbon dioxide as the cooling medium.

Figure 8:
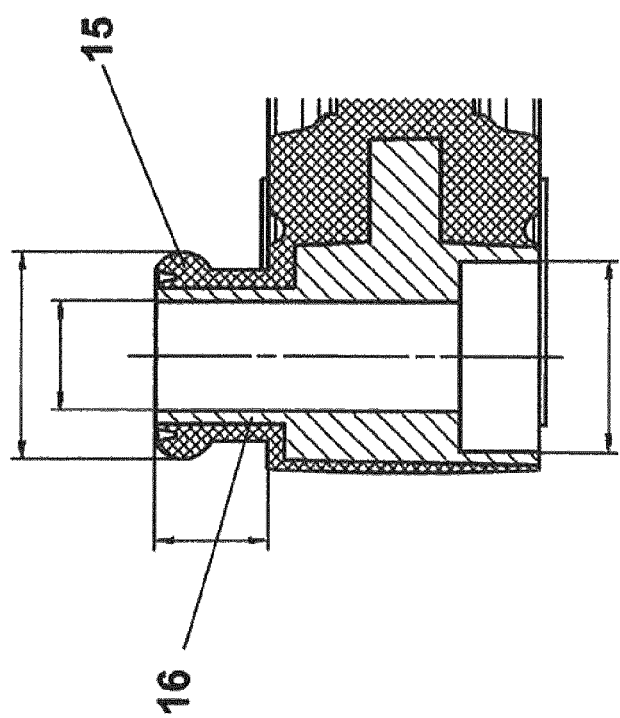
FIG. 8 is a sectional view of an almost rectangular plug-in piece integrated in the frame in the direction perpendicular to the frame.
Figure 9:
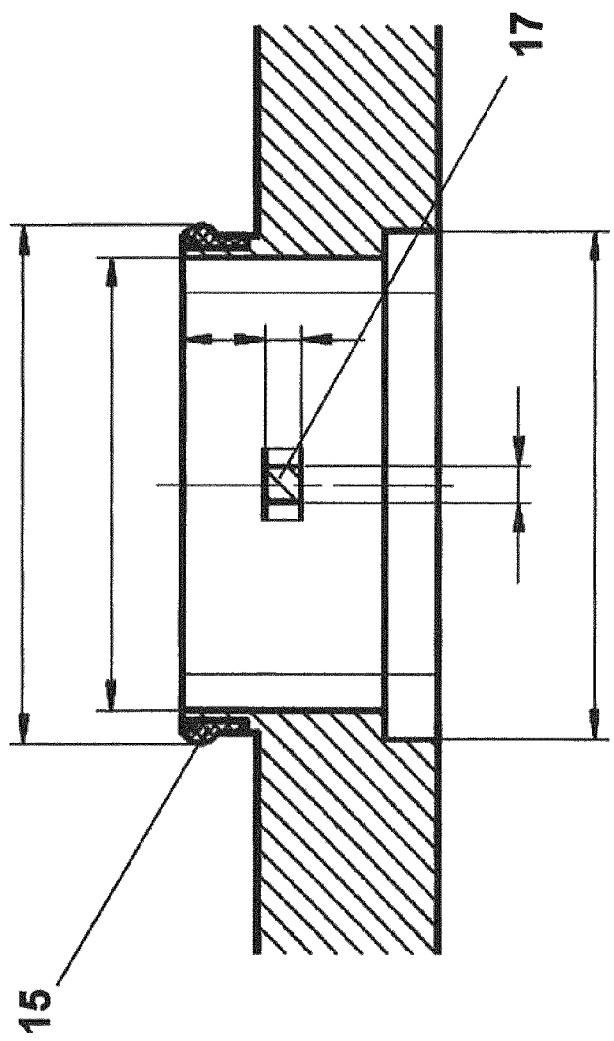
FIG. 9 is a sectional view of an almost rectangular plug-in piece integrated in the frame, in the longitudinal direction of the frame.
Figure 12:
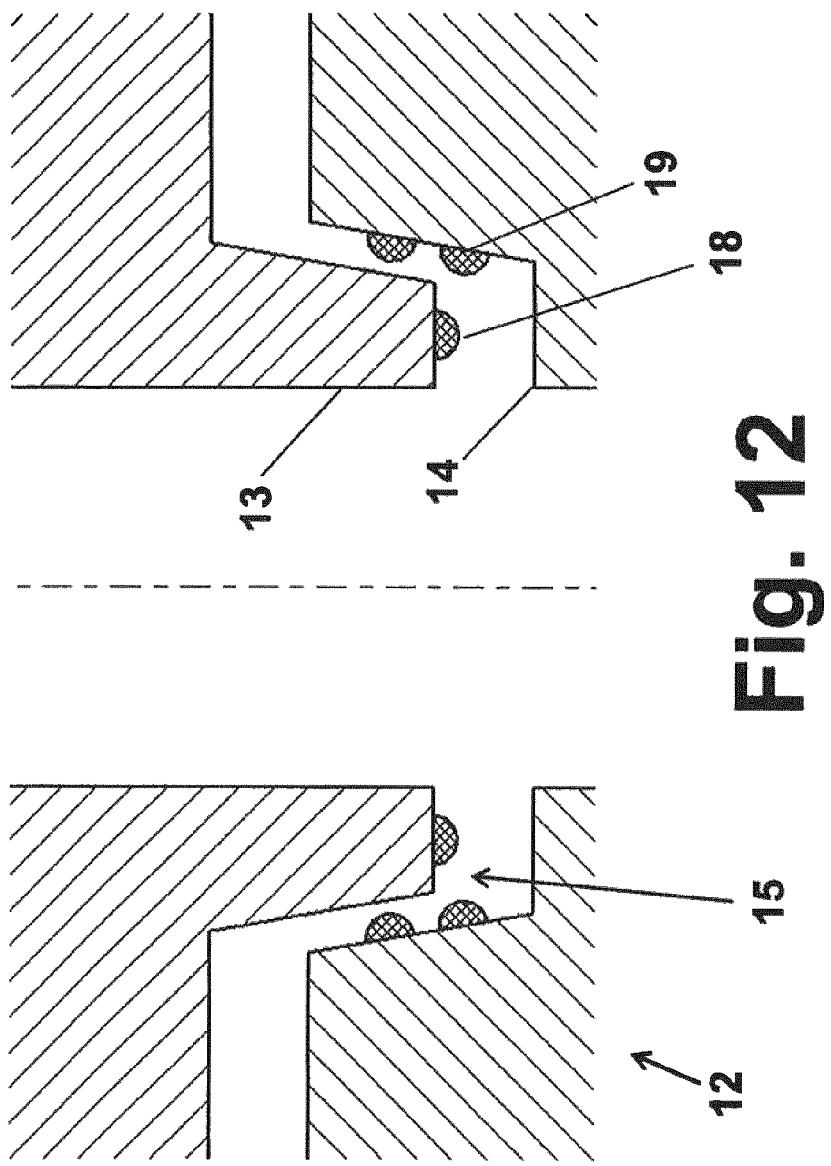
FIG. 12 is a sectional view of two plug-in pieces, a partial seal acting axially being arranged on the male part of a first plug-in piece and two partial seals acting radially being arranged on the female part of a second plug-in piece.
Figure 14:
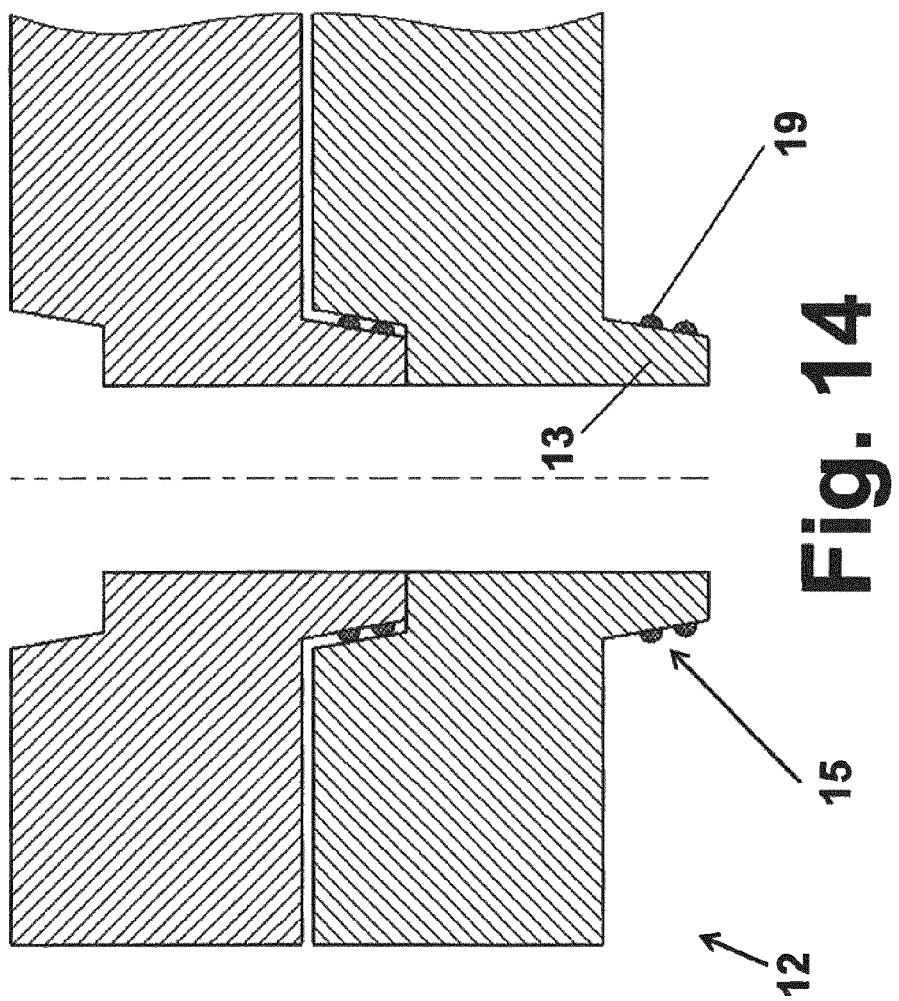
FIG. 14 is a sectional view of two identical plug-in pieces, two partial seals acting radially being arranged on the male part of a plug-in piece and no partial seals being arranged on the female part of the plug-in piece.

FIG. 8 and FIG. 9 are cross sections of an almost rectangular plug-in piece 16. The free cross section achieved here is approximately 4×25 mm². An elastomer seal 15 is attached peripherally.

The plug-in piece 16 is mechanically stabilized by struts 17 attached internally. To improve stability, struts 17 are attached. These struts 17 can either be designed to reduce flow or as a heat transfer element.

Moreover, it is possible to manufacture the plug-in piece 16 from a different material to that from which the frame 4a is manufactured. The plug-in piece 16 can be manufactured from metal. As a result of this, improved heat transfer can be achieved with the same loss of pressure.

It is also conceivable for the strut 17 referred to above to be constructed as a flow element, which directs a solution flowing therethrough to the temperature control surface or side of the frame 4a and thus improves the heat transfer. In this specific case, this would be the side of the frame 4a facing the cell, namely the inner side. In this case, it is feasible to use flow plates and/or platelets.

FIGS. 10 to 19 are schematic views of the seals 15 in the plug-in pieces 12. A plug-in piece 12 has a seal 15, which seals radially and/or axially. For this purpose, a seal 15 comprises a plurality of partial seals 18, 19. Such a seal 15 is therefore multi-lipped. Axial partial seals 18 and radial partial seals 19 are provided.

The plug-in pieces 12 can also be used as an end stop.

The seals 15 of the plug-in pieces 12 are arranged such that sealing connections are achieved axially and radially. In this case, the seals 15 can be attached only to the male, only to the female or to the male and to the female part of a plug-in piece 12.

FIG. 16 shows that by attaching additional fins 20, 21, in this case on the male part 13 of a plug-in piece 12, an end stop of the seal 15 can be ensured. The seal 15 is therefore in a force shunt.

End stops in the axial and radial direction are shown here. One fin 20 acts in the axial direction and one fin 21 acts in the radial direction. End stops, which only act in one direction each, are also conceivable.

Figure 17A:
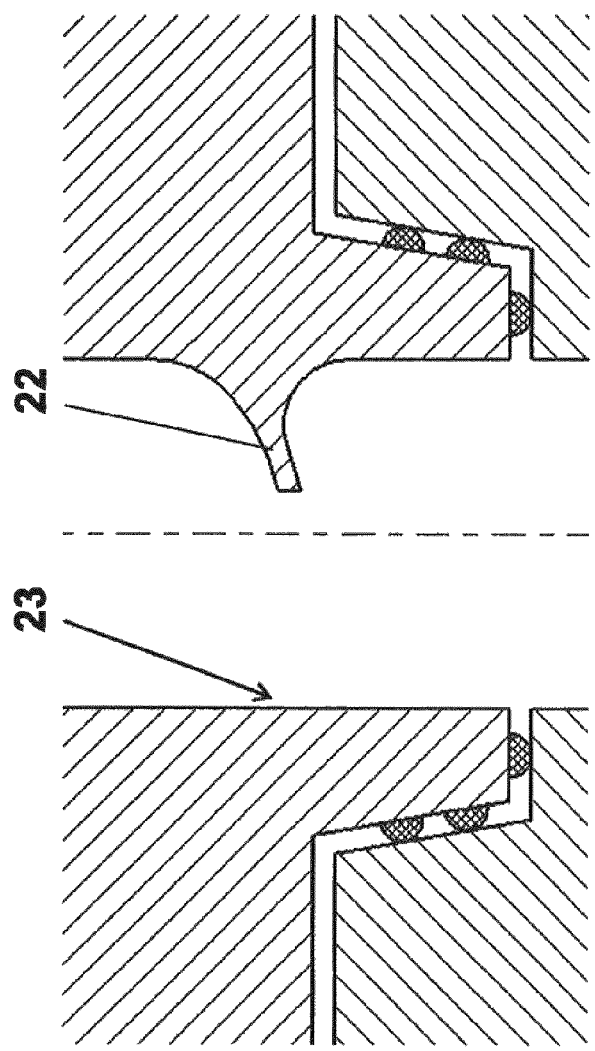
FIG. 17a is a sectional view of a plug-in piece, two partial seals acting radially and one partial seal acting axially being arranged on the male part of a plug-in piece and a flow plate projecting radially inwards being formed.

FIG. 17a shows schematically that a flow plate 22 is arranged in at least one plug-in piece 12. The flow plate 22 is arranged in a cooling duct 6a, the cooling medium flowing towards the flow surface 23 of the frame facing the cell.

It is also shown in FIG. 17a that a flow surface 23 is also arranged in at least one plug-in piece 12. The flow surface 23 is attached towards a cell body 1.

FIG. 17b shows that the flow surface 23 has an increased roughness. The flow surface 23 has an increased thermal conductivity. This is achieved by using a metallic insertion part 24, a so-called insert.

Plates and possible mating surfaces can be achieved only in the male part 13, only in the female part 14 or in one of the two parts 13, 14, respectively. When using a two-component production process, such designs are easy to produce almost without additional cost, for example by using inserts. Moreover, it is conceivable to use plates as structural reinforcement elements.

FIG. 18 shows an arrangement in which at least one tube 25, in which the cooling duct 6a is formed, is directed through the plug-in pieces 12.

The placement of a separate tube 25 into openings in the frame 4a is shown in FIG. 18. In this case, the connection between the frames 4a can be achieved according to any of the options described above. As a result of this, a complete separation of cooling circuit and frame 4a is established. There is a high degree of safety against leaks. Moreover, increased stability is generated since the tubes 25 contribute to the improvement of stability.

No permeation of the cooling medium through the seal 15 can take place. The sealing material therefore does not need to be resistant to cooling medium. The use of thermoplastic elastomers, for example, is possible. A system can also be designed for high pressure. The use of partially fluorinated cooling media or of carbon dioxide as the cooling medium is therefore possible.

FIG. 19 shows an arrangement in which the tube 25 is directed through an opening in a plug-in piece 12, a means 26 for compensating tolerances being arranged between the tube 25 and the inner wall 27 of at least one opening.

FIG. 19 shows the placement of a separate tube 25 into openings in a frame 4a. A compensating layer is placed between the tube 25 and the inner wall 27 of an opening as a means 26 for compensating tolerances, which ensures a form fit between the tube 25 and frame 4a. The heat transfer is optimized as a result.

The layer can comprise a heat conductive elastomer. In this case, a compensating volume for the elastomer in the region between the frames 4a is sensible. The layer can comprise a heat conductive thermoplastic elastomer. Here too, a compensating volume for the elastomer in the region between the frames 4a is sensible. A heat conductive elastomer foam can also be used. In this case, a separate compensating volume can be omitted since the structure of the foam is compressible.

Furthermore, it is conceivable to integrate an external housing into the duct 6a. A connection of the first or last frame 4a to the housing is conceivable.

An additional clipping of the frame 4a and/or plug-in pieces 12 is possible. As a result, an additional safety function can be achieved, since adjacent frames 4a cannot be separated from one another without the use of force.

FIG. 20 shows that a heat transfer fin 28 is arranged in at least one plug-in piece 16.

FIG. 20 shows the almost rectangular plug-in piece 16 shown in FIG. 7 in which heat transfer fins 28 have been attached to improve the heat transfer in the flow duct 16a. As a result, the heat transfer between the cooling medium flowing therethrough and the frame body 4 is improved. In this case, the heat transfer fins 28 can be attached to the side of the frame 4a facing the cell.

In this case, the heat transfer fins 28 can consist of a frame material, which allows cost-effective and simple production. Alternatively, the heat transfer fins 28 can consist of a particularly thermally conductive material, in particular of metals.

FIG. 21 shows a plug-in piece 16 similar to that shown in FIG. 20, in which mechanically reinforcing struts 17 are attached in addition to the heat transfer fins 28. These struts 17 have already been described with reference to FIG. 9.

Figure 22:
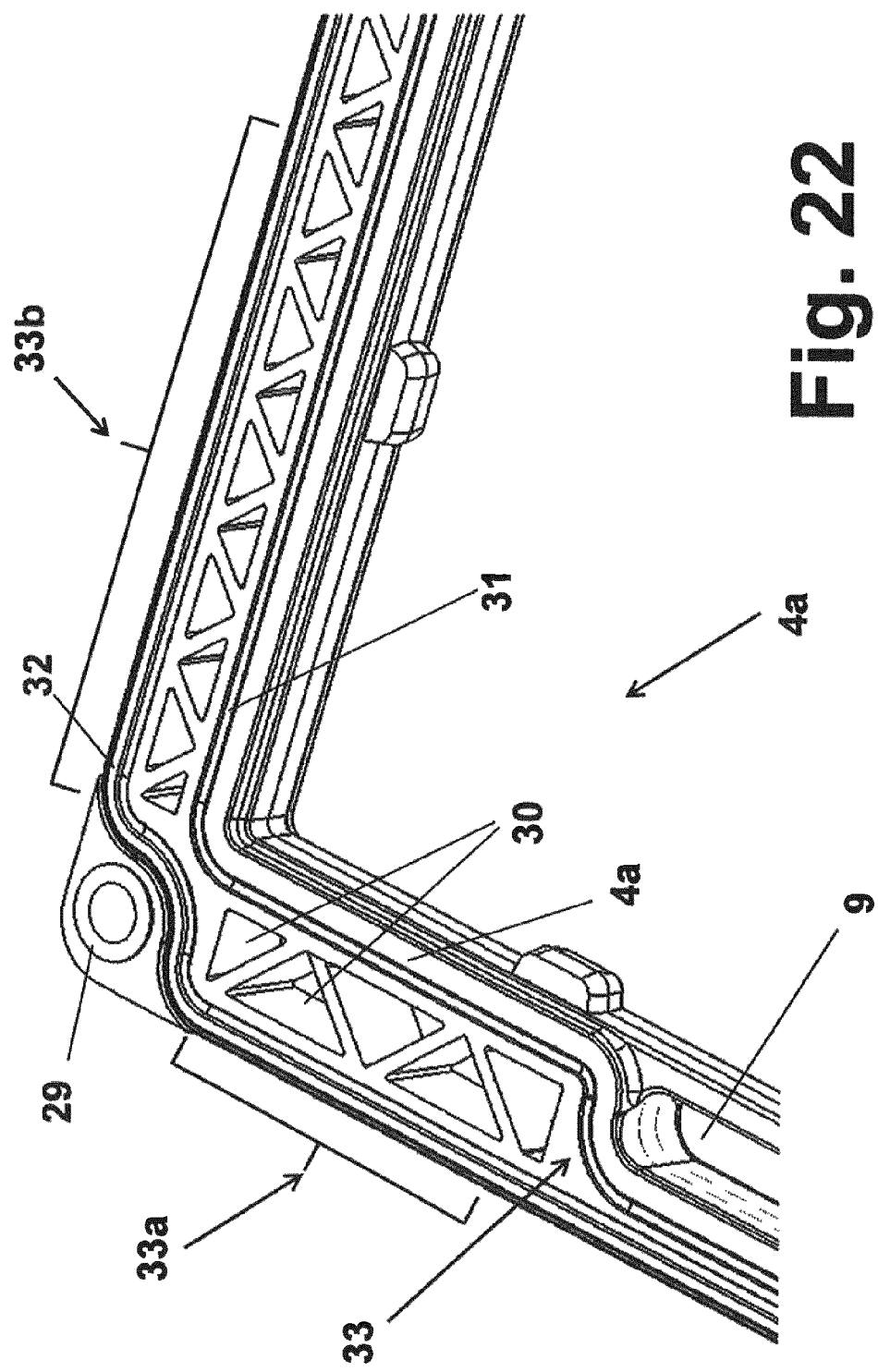
FIG. 22 shows a frame, in which the cooling ducts carrying fluid are formed by a grid structure in the frame, the sealing being provided by cell seals running around the inside and outside.

FIG. 22 shows a frame 4a with the best possible cooling effect. Such frames 4a are connected to one another by metallic reinforcements 29. The cooling medium flows perpendicularly through the frame plane 4b through framework-like recesses 30.

The sealing towards the inside is ensured by a peripheral inner seal 31. The sealing towards the outside is ensured by a parallel peripheral outer seal 32.

In the region of the discharge ducts 9, the inner seal 31 and the outer seal 32 can continue to extend in parallel, as shown in FIG. 22, or meet in the region of an interface 33 such that the discharge duct 9 is left free.

It is also conceivable for portions of the framework-like structure, which the cooling medium flows around, to project out of the frame plane 4b and, similarly to what is shown in FIG. 7, project into recesses in an adjacent frame 4a. In the process, the outwardly projecting structure must again be sealed peripherally. The outwardly projecting structure can comprise short portions 33a or long portions 33b of the periphery.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A frame for fixing one or more cells, the frame comprising:
    a frame body including a cooling duct configured to contain a cooling medium, formed in the body; and
    a plug-in piece configured to connect to an adjacent frame for fixing one or more cells, wherein the cooling duct extends at least partially inside the plug-in piece, wherein the plug-in piece projects at least partially out of a frame plane of the frame, such that the plug-in piece is configured to project into a complementary opening in a plug-in piece of the adjacent frame, and
    wherein the frame further comprises a sealing portion disposed radially between the plug-in-piece and the complementary opening of the plug-in piece of the adjacent frame wherein the sealing portion is configured to seal radially.

2. The frame of claim 1, wherein the plug-in piece has a round or rectangular cross section.

3. The frame of claim 1, wherein the plug-in piece includes a male part and a female part,
    wherein the male part is configured to be introduced into the female part of the adjacent frame, and
    wherein the female part is configured to receive the male part of the adjacent frame.

4. The frame of claim 3, wherein the sealing portion is formed as a radially outward extension of the male part of the plug-in piece.

5. The frame of claim 1, wherein the seal includes an O-ring or insertion part.

6. The frame of claim 1, wherein the seal includes a plurality of partial seals, so as to be multi-lipped.

7. The frame of claim 1, configured withstand pressure up to 10 bar maximum.

8. The frame of claim 1, further comprising:
    a flow plate arranged in the plug-in piece.

9. The frame of claim 1, further comprising:
    a flow surface arranged in the plug-in piece.

10. The frame of claim 9, wherein a roughness of the flow surface is greater than a roughness of a remainder of the plug-in piece.

11. The frame of claim 9, wherein a thermal conductivity of the flow surface is greater than a thermal conductivity of a remainder of the plug-in piece.

12. The frame of claim 9, wherein the flow surface is attached towards a cell body.

13. The frame of claim 1, further comprising:
    a heat transfer fin arranged in the plug-in piece.

14. The frame of claim 1, further comprising:
    a clip element formed in the plug-in piece.

15. The frame of claim 1, wherein the plug-in piece includes a strut, attached internally, the plug-in piece being mechanically stabilized by the strut.

16. An arrangement, comprising:
a first and a second of the frame of claim 1, the frames respectively including a first and a second of the plug-in piece; and
a cell,
wherein the cell is arranged between the frames,
wherein a male part of the first plug-in piece projects into a female part the second frame, and
wherein the cooling duct is directed through the plug-in piece.

17. The arrangement of claim 16, further comprising:
a seal, arranged on the male and/or the female part, is in a main line of force or in a force shunt.

18. The arrangement of claim 16, further comprising:
a tube, in which the cooling duct is formed, directed through the plug-in pieces.

19. The arrangement of claim 18, further comprising:
a tolerance compensator,
wherein the tube is directed through one opening in at least one of the plug-in pieces, and
wherein the tolerance compensator is arranged between the tube and inner wall of at least one opening.

20. The arrangement of claim 16, further comprising:
an external housing, which is part of the cooling duct,
wherein the plug-in piece of a last frame is introduced into a drilled hole in the housing.

21. A battery system, comprising:
the arrangement of claim 16.

22. The frame of claim 1, wherein the sealing portion is formed as a radially inward extension of the complementary opening.

* * * * *